(No Model.)
R. LINKLETTER.
TRANSOM LIFTER.
No. 508,390. Patented Nov. 7, 1893.
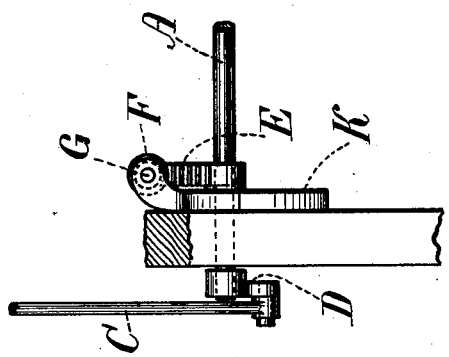
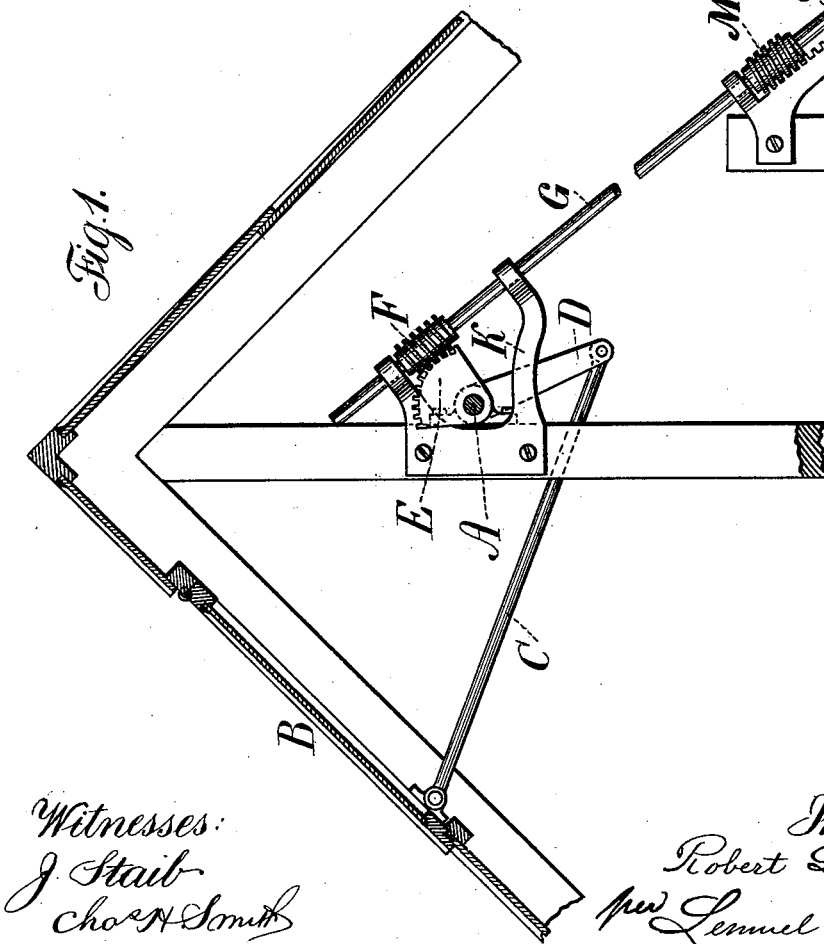
Witnesses:
J. Staib
Chas. H. Smith
Inventor:
Robert Linkletter
per Lemuel W. Serrell

UNITED STATES PATENT OFFICE.

ROBERT LINKLETTER, OF JERSEY CITY, NEW JERSEY.

TRANSOM-LIFTER.

SPECIFICATION forming part of Letters Patent No. 508,390, dated November 7, 1893.

Application filed January 16, 1893. Serial No. 458,460. (No model.)

*To all whom it may concern:*

Be it known that I, ROBERT LINKLETTER, a citizen of the United States, residing at Jersey City, in the county of Hudson and State of New Jersey, have invented an Improvement in Greenhouse-Ventilating Apparatus, of which the following is a specification.

In greenhouses it is usual to make use of swinging sashes in the upper portions of the glass roof, which sashes have heretofore been provided with connections to crank arms upon a longitudinal shaft, and this longitudinal shaft has been rotated by a worm pinion on a vertical or inclined shaft gearing into a worm wheel upon the longitudinal shaft, so that all the sashes can be opened or closed simultaneously, but this operation is slow and does not always allow the attendant to close the ventilators with the required rapidity in case of sudden changes in the wind or temperature. Where the pitch of the worm pinion is increased, the friction and lateral thrust upon the gear wheel become too great, especially in view of the fact that the worm pinion and gear wheel are often in a position where they cannot easily be lubricated.

My present invention is for increasing the rapidity of movement given to the ventilators, without materially increasing the power required to rotate the vertical or inclined shaft and without materially changing the fixtures that are now provided in connection with such greenhouse ventilators.

In carrying out my invention I employ two worm pinions, one of which acts upon the gear wheel upon the longitudinal shaft as usual in greenhouses, and the other worm pinion acts against stationary rack teeth to give an endwise movement to the vertical or inclined shaft itself, and in so doing to increase the movement given by the worm pinion that turns the longitudinal shaft of the ventilating apparatus.

In the drawings, Figure 1 is a diagram illustrating the manner in which the ventilating apparatus is ordinarily applied in conservatories and greenhouses, and Fig. 2 represents the two worm pinions and connected gear endwise of the shaft.

The longitudinal shaft A is supported in suitable bearings beneath the roof of the greenhouse and adjacent to the ventilating sashes B, and from these sashes connecting rods C extend to crank arms D upon the shaft A, and upon the shaft A and usually near one end thereof is a worm gear wheel E engaging the worm pinion F upon the shaft G. This shaft G is sometimes vertical, but more generally at an inclination, so that the crank arm and handle H at the lower end of such shaft can be easily operated to rotate the shaft G and worm pinion F and turn the gear wheel E in opening or closing the ventilators B.

The parts thus far described are of ordinary construction, except that the worm pinion F is preferably of greater length than that usually employed, and it is mounted in a suitable bearing or support K that is bolted or otherwise fastened to one of the standards or other supports in the greenhouse, and the length of this bearing or bracket K is preferably about twice as great as the length of the worm pinion F.

The support or bracket L preferably near the crank handle H is adapted to receive the shaft G through such support or bracket, and keyed upon the shaft G is the worm pinion M, engaging stationary teeth 2 upon the inner edge of the bracket L; and it will be observed that the surfaces of the worm pinion M are at an opposite inclination to the surfaces of the worm pinion F; hence when the shaft G is rotated, the worm pinion M moves the shaft G bodily in either one direction or the other and in so doing the worm pinion F is carried bodily in the same direction in which it is moving the gear wheel E; hence the end movement of the shaft G doubles or increases the action of the pinion F on the wheel E, and this is the case regardless of the direction in which the shaft G may be rotated; hence the operation of the parts in either opening the ventilator or closing the same is accomplished in half the time with the same speed of rotation of the shaft G; and it will be observed that the friction of the pinion F on the wheel E is not changed, and the attendant simply has the increased friction to overcome of the pinion M in contact with the teeth 2 of the bearing or bracket L.

By the present improvement I am enabled to employ the devices usually provided in greenhouses and to increase the speed of movement of the ventilating sashes by simply changing the bracket or bearing K when the same is not of sufficient length to allow the endwise movement of the pinion F, and by providing the worm pinion M and teeth 2 upon the bracket or bearing L.

The pinion F will receive an end movement by the pinion M, as the parts are rotated, regardless of the mechanism that is moved by the wheel or segment E.

I have represented the device as adapted to moving a greenhouse ventilator, but it may be used on a transom or swinging sash.

I claim as my invention—

The combination with the shaft and gear wheel upon the same, of a worm pinion, a shaft for carrying and rotating said worm pinion, a second worm pinion upon the same shaft with the surfaces inclined in the opposite direction, and stationary teeth engaging said worm pinion, whereby the worm pinion shaft is moved endwise to increase the movement given to the gear wheel and shaft, substantially as set forth.

Signed by me this 13th day of January, 1893.

ROBERT LINKLETTER.

Witnesses:
WILLIAM G. MOTT,
A. M. OLIVER.